No. 879,563. PATENTED FEB. 18, 1908.
R. LOHSE.
LIQUID METER.
APPLICATION FILED AUG. 8, 1906.
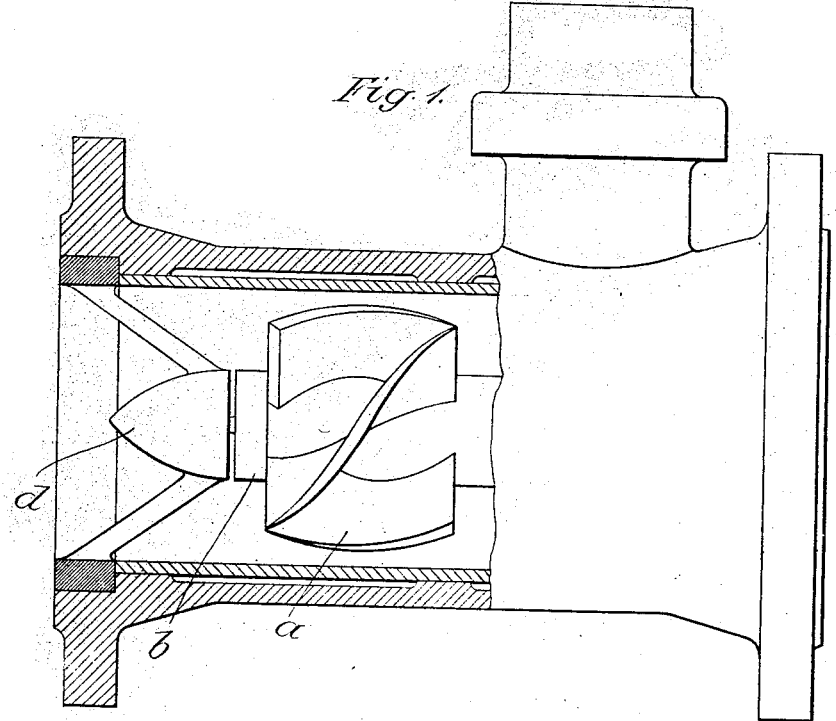
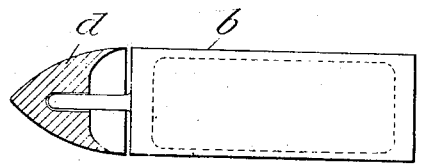
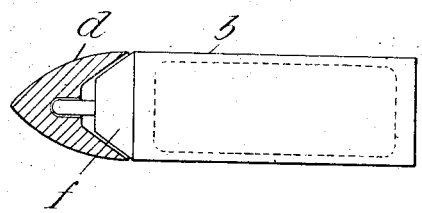
Witnesses
Richard Lohse
Inventor
By Marion & Marion
Attorneys

UNITED STATES PATENT OFFICE.

RICHARD LOHSE, OF BRESLAU, GERMANY.

LIQUID-METER.

No. 879,563. Specification of Letters Patent. Patented Feb. 18, 1908.

Application filed August 8, 1906. Serial No. 329,649.

*To all whom it may concern:*

Be it known that I, RICHARD LOHSE, engineer, a subject of the King of Prussia, residing at 33 Brandenburgerstrasse, Breslau, German Empire, have invented new and useful Improvements in Liquid-Meters, of which the following is a specification.

My invention relates to a liquid meter in which the measuring-device consists of a so-called Woltmann wheel, that is to say, a measuring-wheel located coaxially with the casing and provided with spirally or similarly running vanes, which do not contact with the walls of the casing.

The essential feature of the invention consists in a device located at the place of entrance of the liquid current in such manner that the hollow shaft of the measuring-wheel does not offer any opposing surface to the entering current of liquid. In this manner the pressure of the shaft-pin in the bearing located at the place of exit of the current of liquid is diminished and thus the rotation of the measuring-wheel rendered essentially easier. The means for attaining this purpose may be very variously constructed. If the bearing at the place of inlet of the current of liquid has the form of a conical bullet, it is advantageous to select the diameter of the base of the bearing of the same length as the external diameter of the hollow shaft; the bearing and the hollow axis then supplement each other so as to form a projectile-shaped body.

Two forms of the invention are illustrated in the accompanying drawing.

Figure 1 shows a liquid meter with Woltmann wheel in longitudinal section and part elevation. Figs. 2 and 3 are part sectional views of the device for decreasing the pressure of the pin of the shaft.

As Fig. 1 shows, the measuring-device consists of a wheel $a$ which in itself is well known and whose hollow shaft $b$ is disposed coaxially with the casing and provided with spiral or like vanes or blades which do not contact with the walls of the casing $c$. In this form of construction it is assumed that the bearing $d$ located at the place of entrance of the liquid has the shape of a conical bullet or projectile, whereby the stream of liquid is uniformly and continuously conducted towards the middle of the vanes of the wheel $a$, which rotates in the zone of average velocity.

In order to avoid that the hollow shaft of the measuring-wheel presents an opposing surface to the current of liquid, the diameter of the base of the bearing $d$ is of the same length as the outside diameter of the hollow shaft $b$, so that the pressure of the shaft-pin in the bearing opposite to the bearing $d$ is also diminished.

Upon the bearing at the place of exit of the current of liquid there thus no longer acts a pressure consisting of the pressure of the stream of liquid against the vanes and of the pressure of the stream of liquid against the end of the hollow shaft, but merely the first mentioned pressure.

In the form of construction shown in Fig. 2 the hollow shaft forms a simple hollow cylindrical body; while in the form of construction shown in Fig. 3, the hollow shaft is furnished with a truncated conical extension $f$.

The device for diminishing the pressure of the shaft-pin in the bearing at the place of entrance of the current of liquid may naturally be of other shape than shown. The only essential condition is that the hollow shaft itself offers no opposing surface to the inflowing current of water, such as increases the pressure of the shaft-pin in the bearing located opposite the bearing $d$.

Having thus described my invention, what I claim as new and desire to secure by Letters Patent of the United States is:—

In a fluid meter, the combination of a cylindrical casing, a conical forward bearing block provided with an axially extending conical recess in its base, a shaft of the same diameter as the base of said forward bearing block, a tapered portion extending from the forward end of said shaft into the conical recess of said bearing block and formed with a taper corresponding to that of said recess, and a measuring wheel carried by said shaft, substantially as described.

In witness whereof I have hereunto signed my name this 21 day of July 1906, in the presence of two subscribing witnesses.

RICHARD LOHSE.

Witnesses:
EUGEN WEIMAR,
OLEAN GUTTSMANN.